United States Patent [19]

Hsu

[11] Patent Number: 4,636,394

[45] Date of Patent: Jan. 13, 1987

[54] METHOD AND COMPOSITIONS FOR CHILLPROOFING BEVERAGES

[75] Inventor: Wen-Pin Hsu, Woodhaven, N.Y.

[73] Assignees: J. E. Siebel Sons' Company, Inc., Chicago, Ill.; PQ Corporation, Valley Forge, Pa.

[21] Appl. No.: 600,508

[22] Filed: Apr. 16, 1984

[51] Int. Cl.<sup>4</sup> .............................................. C12H 1/02
[52] U.S. Cl. ................................. 426/330.4; 426/423; 426/442
[58] Field of Search ............ 426/423, 422, 330, 330.3, 426/330.4, 442; 260/112 R

[56] References Cited

U.S. PATENT DOCUMENTS

| | | | |
|---|---|---|---|
| 3,163,538 | 3/1963 | Raible | 426/423 |
| 3,436,225 | 4/1969 | Raible | 426/423 |
| 3,617,301 | 11/1971 | Barby et al. | 426/442 |
| 3,818,111 | 6/1974 | Hoover | 426/442 |
| 3,878,300 | 4/1975 | Milligan | 426/442 |
| 3,958,023 | 5/1976 | Butterworth | 426/330.4 |
| 4,288,462 | 9/1981 | Hou et al. | 426/330.3 |
| 4,508,742 | 4/1985 | McLaughlin et al. | 426/423 |
| 4,515,821 | 5/1985 | Armstead et al. | 426/423 |

FOREIGN PATENT DOCUMENTS

| | | | |
|---|---|---|---|
| 938153 | 10/1961 | United Kingdom | 426/423 |
| 981715 | 1/1965 | United Kingdom | 426/423 |
| 1215928 | 12/1970 | United Kingdom | 426/423 |
| 1279250 | 6/1972 | United Kingdom | 426/423 |

OTHER PUBLICATIONS

Findlay, 1971, Modern Brewing Technology, Macmillan Press, pp. 279–285.
Gutcho, 1969, Alcoholic Malt Beverages, Noyes Development Corporation, pp. 265–271.
Unilever, 1984, European Patent Application Publication No. 0,105,633.

*Primary Examiner*—Raymond N. Jones
*Assistant Examiner*—Carolyn Paden
*Attorney, Agent, or Firm*—Ernest G. Posner; J. S. Stephen Bobb

[57] ABSTRACT

A combination of two distinct amorphous silicas, one having a moisture content of 30% or greater and one having a moisture content of below 30%, and each further characterized by particular properties of surface area, pore volume, pore size and particle size, is used to chillproof beer (as well as other fermented or unfermented beverages) by removing chill haze precursors therefrom.

18 Claims, No Drawings

METHOD AND COMPOSITIONS FOR CHILLPROOFING BEVERAGES

BACKGROUND OF THE INVENTION

The present invention relates to the selective removal of substances from liquid solutions and/or suspensions and, more particularly, to the chillproofing of beverages such as beer.

For many years it has been known that, unless specially treated, stored beers will undergo reactions which result in the production of insoluble compounds and complexes which impart a distinct haze or turbidity to the beer, most noticeable at low temperatures (e.g., below about 20° C.), which is perceived by the consumer as undesirable. That portion of the haze which is exhibited at low temperatures but which disappears at temperatures at or above 20° C. is referred to in the art as "chill haze", while any remaining haze at these temperatures is referred to as "permanent haze". As the storage time in kegs, cans or bottles increases, the amount of chill haze exhibited also increases and can also lead to an increase in the amount of permanent haze (i.e., a greater amount of the haze exhibited at low temperatures does not disappear at temperatures at or above 20° C.).

The preference of beer consumers, particularly in the United States, for drinking beer at very cold temperatures makes the problem of dealing with chill haze extremely important. This is further attenuated by the fact that present day mass manufacturing and marketing conditions can result in long periods of time (often as long as six months to a year) between the manufacture of beer and its ultimate consumption. As a consequence, it is well known in the art to seek to "chillproof" beer, i.e., to take steps which lead to elimination or substantial reduction of chill haze.

Chill haze in beer is generally understood to comprise reaction products of materials such as proteins, polyphenols and carbohydrates, which materials are introduced into the beer via the raw ingredients used in beer making and/or result from the fermentation process. The interaction of proteins and polyphenols in beer plays the major role in chill haze formation and, as a consequence, most prior art attempts to eliminate or reduce chill haze focus upon either protein or polyphenol components.

Proposals for the chillproofing of beer have been many. One potential solution is to hold beer for an extended period of time at conditions which promote haze formation, making it possible to then physically remove the formed compounds prior to bottling, canning or other like packaging. This is hardly a practical solution, however, since it greatly increases the time and cost involved in beer making per se. Another similar approach to chillproofing is to accelerate formation of haze by overtly adding polyphenols such as tannins, anthocyanogens or gelatin-rutin complexes to the beer and then filtering the beer to remove the formed compounds prior to bottling, etc. A still further approach which has been suggested is to choose and/or pre-treat the raw materials used in beer making in an attempt to limit the concentration of, e.g., polyphenols introduced into the beer during the beer-making process.

By far the most prevalent approach to the problem of chill haze, however, is the treatment of beer with agents to partially remove or otherwise eliminate either proteins or polyphenols from the beer prior to bottling, canning or other like packaging operation, and thereby eliminate one of the reactants involved in haze formation. One of the earliest known methods for chillproofing beer in this manner involved contact of the beer with proteolytic enzymes to hydrolyze proteins (U.S. Pat. No. 995,820 to Leo Wallerstein). However, as a result of consumer concerns regarding additives in general and stricter labelling laws requiring listing of additive materials such as proteolytic enzymes which remain in the final product, the art moved in the direction of utilizing solid absorbent materials to remove either proteins or polyphenols from beer, in which the absorbent (and bound protein or polyphenol) is removed from the beer by filtering prior to bottling or canning. For example, U.S. Pat. No. 2,416,007 discloses the use of a magnesium silicate clay as an absorbent for proteins in beer, while U.S. Pat. No. 3,251,693 describes the use of synthetic calcium, magnesium and zinc silicates for chillproofing beer. Materials such as Nylon-66, polyvinyl polypyrrolidone and other polyamides are known for use in chillproofing of beer for their ability to sorb polyphenols (particularly anthocyanogens). See, e.g., U.S. Pat. No. 2,688,550. In addition, various polymeric derivates of silicic acid are known for use in sorbing proteins in chillproofing processes.

A major consideration in this approach to chillproofing, however, is that materials within the class of proteins and polyphenols are important contributors to the desirable foaming and taste characteristics of beer. Hence, absorbent materials used as chillproofing agents must exhibit a degree of selectivity in removing protein or polyphenolic haze precursors. In addition, chillproofing agents must be inexpensive relative to the overall cost of making beer, and must effect the requisite degree of absorption within a reasonably short residence time with the beer.

Accordingly, despite the variety of chillproofing agents known in the art, research and development continues in search of agents useful for such purposes which offer advantages in terms of expense and/or selectivity over known materials.

SUMMARY OF THE INVENTION

It is an object of the present invention to provide a method for the chillproofing of beer.

Another object of the invention is to provide a composition useful for the chillproofing of beer.

A further object of the invention is to provide a process and composition for the selective removal of particular materials, such as proteins, from a liquid medium in which such proteins are dissolved, dispersed or suspended.

These and other objects are achieved by virtue of the discovery that the combined activity of particular amorphous silicas of defined properties in selectively removing dissolved, dispersed or suspended materials from a liquid medium (e.g., in removing chill haze precursors from beer) is superior to use of the amorphous silicas alone.

The amorphous silicas for use in the present invention are characterized by their moisture content and their physical properties. According to the invention, processes and combinations are provided which employ a first amorphous silica having a moisture content of about 30% or greater and a second amorphous silica having a moisture content of less than about 30%. Each of these first and second silicas is further characterized by particular properties set forth hereinafter.

The amorphous silicas for use in the present invention are amorphous condensation polymers of silicic acid which are prepared by the so-called hydrogel process wherein, e.g., an aqueous sodium silicate solution is acidified with an acid such as sulfuric acid to form a colloidal solution of particles of polysilicic acid. Held at low pH, this colloidal solution eventually sets to a relatively hard, translucent, jelly-like mass commonly referred to as a hydrogel.

Hydrogels, which by tradition refer to amorphous silicas made according to the foregoing process which have a moisture content of about 60–70% by weight, can be dried by a number of methods to produce amorphous silicas having less moisture. Certain of these reduced moisture silicas have come to be known by particular names depending upon their moisture content and/or the method of drying employed. For example, silica hydrogels dried to a moisture content of 40–50% have at times been referred to as "xerogels" and silica hydrogels in which substantially the entire moisture content has been replaced by a gas have been referred to as "aerogels". However, the terminology employed in such cases has been far from uniform and many instances exists where amorphous silicas do not fit within such labels, e.g., amorphous silicas obtained by drying a silica hydrogel to a low moisture content but without use of the particular techniques used to form aerogels.

Accordingly, for purposes of the present invention, the particular amorphous silicas are simply referred to as a first amorphous silica having a moisture content of about 30% or greater and a second amorphous silica having a moisture content below about 30%, each silica being further characterized by particular physical properties.

In accordance with a specific object of the invention, a process is provided for chillproofing beer in which beer, at some point in the overall beer-making process prior to bottling (or canning, etc.), is contacted both with a first amorphous silica having a moisture content of 30% or greater and a second amorphous silica having a moisture content below about 30%, such contacting being for a time sufficient to permit these materials to selectively sorb chill haze precursors (particularly, proteins) from the beer, and thereafter separating the amorphous silicas from the beer. According to various embodiments of this specific invention, the beer can be contacted with a pre-formed mixture of these amorphous silicas; or both the amorphous silicas can be separately added to beer at a particular point in the process; or the beer can be contacted with one of these materials at one point in the process and with the other material at a different point in the process.

The amorphous silica generally known in the art as silica hydrogel is known for use in the chillproofing of beer as a means of absorbing protein precursors of haze. See, for example: Hough, J. S., "Silica Hydrogels For Chill-Proofing Beer", MBAA Technical Quarterly, Vol. 13, No. 1, pp. 34–39 (1976); Halcrow, R. M., "Silica Hydrogels", The Brewers Digest, pp. 44 (August 1976); and Hough, J. S. and Lovell, A. L., "Recent Developments In Silica Hydrogels For The Treatment And Processing Of Beers", MBAA Technical Quarterly, Vol. 16, No. 2, pp. 90–100 (1979). The required usage rate for such material, however, is quite high, thereby increasing the cost of chillproofing and necessitating the provision of a large storage area for the silica hydrogel. In addition, the use of such quantities of silica hydrogel results in relatively rapid blinding of the filters employed to remove the hydrogel (and its absorbed materials) from the beer in the final filtration. Still further, the disposal of such large quantities of silica hydrogel after filtration and the not insignificant loss of beer carried out by the hydrogel pose yet additional problems and expenses.

Silica hydrogel has been combined with another material known in the art for use in the chillproofing of beer, namely, polyvinyl polypyrrolidone (PVPP). The functionality of PVPP in chillproofing is to sorb polyphenol (anthocyanogen) precursors of haze, while the action of silica hydrogel is to sorb protein precursors of haze. The overall usage level of PVPP when used alone in chillproofing is significantly less than that for silica hydrogel alone, but PVPP is about 10-times more expensive than silica hydrogel. A combination of silica hydrogel and PVPP is effective in preventing chill haze formation, but not at use levels sufficiently low to offer any significant cost advantage or to minimize problems occassioned by relatively large quantities of silica hydrogel.

An amorphous silica referred to as a silica xerogel (obtained by drying a silica hydrogel) also has been investigated as a (protein-sorbing) chillproofing agent for beer. See, Hough, J. S. and Lovell, A. L., supra. A silica xerogel having a lower moisture content than a typical hydrogel offers, in theory, a means to achieve chillproofing at a relatively lower dosage rate than required with silica hydrogels. However, a number of drawbacks exist with respect to use of silica xerogels. Because of their low moisture content, silica xerogels are extremely dusty and pose difficult handling problems. Functionally, silica xerogels are not as selective as silica hydrogels and require a longer contact time with the beer to effect any degree of chillproofing. Silica xerogels can be produced so as to have an extremely large surface area ideal for sorption but such xerogels have, at the same time, such a small pore diameter that the proteins sought to be removed from beer cannot gain access to the sorbent surface. Xerogels with a larger pore diameter sufficient for admitting protein molecules are known, but have a very low surface area and, hence, a low sorptive capacity.

In accordance with the present invention, it has been found that a combination of two amorphous silicas of defined properties is highly effective in the prevention of chill haze in beer and enables a significant reduction in the amount of silica otherwise required according to known methods using, e.g., a so-called silica hydrogel or a silica xerogel for chillproofing, thereby significantly minimzing the cost and other problems associated with use of these individual materials.

The conjoint use of the amorphous silicas for chillproofing in accordance with the invention can further be supplemented with use of other agents useful in chillproofing such as polyamides, natural silicates, synthetic silicates and the like.

DETAILED DESCRIPTION OF THE INVENTION

As noted, the amorphous silicas for use in the present invention are amorphous condensation polymers of silicic acid having varying moisture contents. The first amorphous silica has a moisture content of at least about 30% by weight and therefore embraces, at least insofar as moisture content is concerned, materials variously referred to in the art as silica xerogels, silica hydrogels, and hydrous silica gels. In preferred embodiments of the invention, the first amorphous silica will have a moisture content of above about 55% by weight, and most preferably from about 65 to 70% by weight. Also preferred in the present invention is an amorphous silica having a moisture content of from about 30 to 35% by weight.

The second amorphous silica has a moisture content of less than about 30% by weight, and preferably less than about 10% by weight.

Preferred combinations (either admixed per se or combined in terms of conjoint use) of these amorphous silicas include a first amorphous silica having a moisture content of 65 to 70% with a second amorphous silica having a moisture content of less than 10%, as well as a first amorphous silica having a moisture content of 30 to 35% by weight with a second amorphous silica having a moisture content of less than 10% by weight.

Particularly preferred as the second amorphous silica is a hydrated amorphous silica in which the moisture is present as hydroxyl groups attached to surface silicon atoms.

For use in the present invention, the first amorphous silica, in addition to having a moisture content of at least about 30%, should have a surface area (BET) of from about 300 to about 800 m$^2$/g. The average pore diameter of the silica should be in the range of from about 30 Å to about 1200 Å. The pore volume should be in the range of from about 0.9 to about 1.8 ml/g, and the average particle size should be less than about 40 microns.

A preferred first amorphous silica has a moisture content of about 65 to 70% by weight; a surface area of from about 600–700 m$^2$g; a pore volume of from about 0.9 to 1.1 ml/g; an average pore diameter of about 1000 to 1200 Å; and an average particle size of less than 40 microns.

Other preferred first amorphous silicas include those having a moisture content in the range of from about 30 to 40% by weight and which have a surface area in the range of from about 300 to 400 m$^2$/g; a pore volume of from about 1.0 to 1.8 ml/g; an average pore diameter of from about 100 to 200 Å; and an average particle size of less than about 15 microns (e.g., for at least about 85–90% of the particles).

Another preferred first amorphous silica is one having a moisture content of from about 65 to 70% by weight; a surface area of from about 600 to 800 m$^2$/g; a pore volume of from about 0.9 to 1.8 ml/g/; an average pore diameter of from about 30 to 120 Å; and an average particle size of less than about 20 microns.

For use in the present invention, the second amorphous silica, in addition to having a moisture content below about 30% by weight, also should have a surface area (BET) in the range of from about 200 to about 700 m$^2$/g; an average pore diameter in the range of from about 50 Å to about 300 Å; a pore volume in the range of from about 1.0 ml/g to about 1.6 ml/g; and an average particle size generally less than about 20 microns. In the most preferred embodiment of the invention, the second amorphous silica has a moisture content of below about 10% by weight, and has physical properties within the ranges stated above.

A particularly preferred material for use as the second amorphous silica according to the invention is one having a surface area in the range of from about 250 to 350 m$^2$/g; an average pore diameter in the range of from about 120 to about 160 Å; a pore volume in the range of from about 1.0 to about 1.4 ml/g; and an average particle size of less than about 10 microns.

For use in the chillproofing of beer, first and second amorphous silicas can be utilized at varying levels at various points in the beer making process. Generally, the usage level of the first amorphous silica will be in the range of from about 60 ppm to about 280 ppm, and preferably from about 120 ppm to about 200 ppm. Usage levels for the second amorphous silica will generally be in the range of from about 40 ppm to about 120 ppm, with a preferred range being from about 60 ppm to about 80 ppm. The ratio of second amorphous silica usage to that of the first amorphous silica typically will be in the range of from about 1:7 to about 1:1, and preferably from about 3:7 to about 2:3.

The foregoing levels and ratios represent total amounts of the first and second amorphous silicas with which the beer is contacted. The contacting of the beer with these silicas can be effected in a variety of manners. In typical beer-making processes, wort is fermented in the presence of yeast and the fermented wort then subjected to some form of resting or aging treatment commonly referred to as ruh storage. At this point in the process, the beer ("ruh") generally is filtered to remove particulate material and the filtered beer then treated with chillproofing agents which, after a predetermined residence time, are then filtered from the beer. Processes also are known wherein the chillproofing agents are added during ruh storage, prior to filtration, as a body feed and/or as part of a precoat layer or after precoat layer on the filter used to filter the ruh in order to avoid a final filtration step. See U.S. Pat. No. 3,958,023.

In the present invention, the beer can be brought into contact with the first and second amorphous silicas at any one or more points in the beer-making process where chillproofing agents conventionally are added. Generally, each of the silicas (or a mixture thereof) will be added to beer in the form of a slurry, e.g., water or beer, typically at slurry concentrations of up to about 10% by weight. The first and second amorphous silicas may be pre-blended in powder form and the mixture then slurried in water or beer prior to addition of the mixture to beer for chillproofing, or the materials can each be separately slurried, then admixed and then added to the beer. Alternatively, the first and second amorphous silicas (or portions of the total quantities thereof used in the process) can be separately slurried and separately added to the beer. It also is within the contemplation of the present invention that all or part of the first and second amorphous silicas be contacted, separately or in combination, with the beer at different points in the beer-making process, e.g., as both body feed and as filter precoat.

In the preferred method of practicing the invention, a slurried mixture of first amorphous silica and second amorphous silica is introduced into a pipeline through which the beer flows during the beer-making process so as to assist in dispersion of the silicas in the beer and enhance sorption of chill haze precursors therefrom. The beer is then finally filtered to remove the silica absorbents prior to bottling, canning, kegging, etc.

As earlier noted, the treatment of beer with both a first amorphous silica and a second amorphous silica according to the invention can be supplemented with use of one or more different solid sorbents which are effective in removing chill haze precursors from beer. Examples of these additional agents are polyvinyl polypyrrolidone, Nylon-66 and other polyamides, synthetic magnesium, calcium or zinc silicates (typically having an MgO, CaO or ZnO content of greater than 15%), natural clays (e.g., montmorillonite, hectorite), and the like.

As with the combined treatment with the first and second amorphous silicas according to the invention, the use of additional chillproofing agents may take the form of a physical admixture with the first amorphous silica and/or the second amorphous silica prior to contact with beer or can, in whole or in part, be added to beer apart from the first and second amorphous silicas at the same or some different point in the beer-making process.

The temperature of the beer during the contacting with the first and second amorphous silicas, and any other supplemental chillproofing agent, is not critical per se and generally is within the range of from about $-2°$ C. to about $2°$ C., i.e., temperatures of the beer itself in the normal course of beer-making.

Apart from the chillproofing of beer (including ale and other fermented malt beverages), the combined treatment with a first amorphous silica and a second amorphous silica to remove chill haze precursors can be used according to the invention to treat other beverages such as wine, fruit or vegetable juices and the like. In its broadest aspects, the present invention provides a process for removing proteins from any liquid medium in which proteins are dissolved, suspended or dispersed.

Specific features of the present invention are explained in further detail with the aid of the following illustrative examples.

EXAMPLE I

In this example, a commercial ruh beer ready for treatment with a chillproofing agent was divided into a number of equal samples and treated with the chillproofing agents and compositions set forth below in the concentrations indicated.

The first amorphous silica, denominated as Agent A in this example, was a commercially available silica sold by Schwarz Services International, Ltd. under the designation BK75. This silica has a moisture content of about 65% by weight; a surface area of about 630–650 $m^2/g$; a pore volume of about 0.9 to 1.1 ml/g; an average pore diameter of about 1000 to 1200 Å; and an average particle size of less than 40 microns (95-98% of the particles).

The second amorphous silica, denominated as Agent B in this example, is an amorphous hydrated silica sold by Glidden Pigments under the tradename SiL-PROOF BG-6. This silica has a moisture content of about 2% by weight; a surface area of 300 $m^2/g$; a pore volume of 1.2 ml/g; an average pore diameter of 140 Å; and an average particle size of about 4 microns.

For use as a control in this example, an amorphous silica available from Miles Laboratories under the tradename "Chillgarde" was used. This material has a moisture content of about 58 to 67% by weight; a surface area of 700 $m^2/g$ (minimum); a pore volume of about 1.6 ml/g; an average pore diameter of from about 40–90 Å; and an average particle size of about 16 microns. This silica is widely used in North American breweries at a concentration rate of 10 pounds per 100 barrels of ruh.

The samples of ruh were treated with the following agents:

| | |
|---|---|
| Sample 1 | Agent A (5 lb./100 bbl.) and Agent B (1 lb./100 bbl.) |
| Sample 2 | Agent A (5 lb./100 bbl.) and Agent B (2 lb./100 bbl.) |
| Sample 3 | Agent A (5 lb./100 bbl.) and Agent B (3 lb./100 bbl.) |
| Sample 4 | Agent A (5 lb./100 bbl.) and Agent B (4 lb./100 bbl.) |
| Sample 5 | Control agent (10 lb./100 bbl.) |

For each sample, the ruh was mixed for three (3) minutes with the particular chillproofing agent or mixture of agents (agent(s) slurried in water for admixture with the ruh). After such treatment, Celite filter aid was then added to each sample and the sample passed through a Celite precoated filter pad for final filtration. The filtered beers were carbonated and bottled in a conventional manner. Each beer was then analyzed for haze formation after storage for 6 days at 60° C. followed by storage for one day at 0° C. The results, expressed in Formazin Turbidity Units (FTU) were as follows:

TABLE I

| Sample No. | FTU |
|---|---|
| 1 | 65 |
| 2 | 64 |
| 3 | 56 |
| 4 | 42 |
| 5 | 120 |

EXAMPLE II

The identical procedure as set forth in Example I was employed in a further test of the chillproofing effect of particular agents and compositions, using the same commercial ruh.

In this example, Agent A and Agent B are as described in Example I. Agent C in the present example was the same amorphous silica used for the control in Example I. Agent D in the present example is a silica gel commercially available from Davison Chemical (division of W. R. Grace & Co.) under the tradename CL 920. This silica has a moisture content of about 30–35% by weight; a surface area of 350 $m^2/g$; a pore volume of 1.4 ml/g; an average pore diameter of 160 Å; and an average particle size of 12 microns.

The four samples used in this test were treated as follows:

| | |
|---|---|
| Sample 6 | Agent B (1.5 lb./100 bbl.) and Agent A (3.5 lb./100 bbl.) |
| Sample 7 | Agent B (1.5 lb./100 bbl.) and Agent C (3.5 lb./100 bbl.) |
| Sample 8 | Agent B (1.5 lb./100 bbl.) and Agent D (3.5 lb./100 bbl.) |
| Sample 9 | Agent A (10 lb./100 bbl.) |

The results of analyses for haze formation after six days storage at 60° C. followed by one day storage at 0° C. are set forth in Table II.

TABLE II

| Sample No. | FTU |
|---|---|
| 6 | 86 |
| 7 | 128 |
| 8 | 117 |

TABLE II-continued

| Sample No. | FTU |
|---|---|
| 9 | 82 |

EXAMPLE III

Again following the procedures set forth in Example I, a commercial ruh was divided into five (5) samples for treatment with chillproofing agents.

In these tests, the first amorphous silica (having a moisture content of at least 30%) was Agent A as described in Example I. For samples 10, 11 and 12, this silica was combined with three different second amorphous silicas according to the invention. The first (for use in sample 10) was Agent B as described in Example I. The second (for use in sample 11 and designated Agent E) was a hydrated amorphous silica sold by Glidden Pigments under the tradename SiLCRON G-600. This material has a moisture content of about 2% by weight; a surface area of 325 $m^2/g$; a pore volume of 1.2 ml/g; an average pore size or diameter of 130 Å; and an average particle size of 4.7 microns.

The third silica used as the "second amorphous silica" in this Example (used for sample 12, and designated Agent F), was a hydrated amorphous silica sold by Glidden Pigments under the tradename SiLCRON G-100 T. This material has a moisture content of about 2.0% by weight; a surface area of 275 $m^2/g$; a pore volume of 1.4 ml/g; an average pore size or diameter of 260 Å; and an average particle size of 2.7 microns.

The five samples used in this test were as follows:

| Sample 10 | Agent A (3.5 lb./100 bbl.) and Agent B (1.5 lb./100 bbl.) |
| Sample 11 | Agent A (3.5 lb./100 bbl.) and Agent E (1.5 lb./100 bbl.) |
| Sample 12 | Agent A (3.5 lb./100 bbl.) and Agent F (1.5 lb./100 bbl.) |
| Sample 13 | Agent A (10 lb./100 bbl.) |
| Sample 14 | Agent C (10 lb./100 bbl.) |

The results of analyses for haze formation after six days storage at 60° C. followed by one day storage at 0° C. are set forth in Table III.

TABLE III

| Sample No. | FTU |
|---|---|
| 10 | 109 |
| 11 | 114 |
| 12 | 141 |
| 13 | 94 |
| 14 | 220 |

As is demonstrated in the foregoing examples, the combination of the particular amorphous silicas of the invention is effective to satisfactorily chillproof beer at usage levels significantly below these required when using particular chillproofing agents alone, thereby reducing the cost of the treatment. The beers treated with the combination of silicas containing to the invention were at least equal in taste and foaming characteristics to those of control samples, indicating no loss in selectivity in removal of haze precursor components.

What is claimed is:

1. A method for chillproofing beer by removing chill haze precursors therefrom, comprising contacting beer with both a first amorphous silica and a second amorphous silica for a period of time sufficient to effect sorption by said silicas of chill haze precursors, and thereafter separating said silicas from the beer, said first amorphous silica having a moisture content of at least about 30% by weight and having a surface area in the range of from about 300 to about 800 $m^2/g$, a pore volume of from about 0.9 to about 1.8 ml/g, an average pore diameter of from about 30 to about 1200 Å, and an average particle size of less than about 40 microns; said second amorphous silica having a moisture content of less than 30% by weight and having a surface area in the range of from about 200 to about 700 $m^2/g$, a pore volume of from about 1.0 to about 1.6 ml/g, an average pore diameter of from about 50 to about 300 Å, and an average particle size of less than about 20 microns; wherein the weight ratio of the amount of said second amorphous silica with which the beer is contacted to the amount of said first amorphous silica with which the beer is contacted is in the range of from about 1:7 to 1:1.

2. The method according to claim 1 wherein said beer is contacting a slurry of said first amorphous silica and said second amorphous silica in a medium selected from the group consisting of water and beer.

3. The method according to claim 2 wherein said slurry is added to a flowing stream of said beer.

4. The method according to claim 1 wherein said contacting comprises, at least in part, flowing said beer through a filter having a precoat layer containing said first amorphous silica and said second amorphous silica.

5. The method according to claim 1 wherein said first amorphous silica has the following properties:
   Pore Volume: about 0.9 to 1.1 ml/g
   Pore Size: about 1000 to 1200 Å
   Surface Area: about 600 to 700 $m^2/g$
   Particle Size (average): less than about 40 microns
and wherein said second amorphous silica has the following properties:
   Pore Volume: about 1.0 to 1.4 ml/g
   Pore Size: about 120 to 160 Å
   Surface Area: about 250 to 350 $m^2/g$
   Particle Size (average): less than about 10 microns.

6. The method according to claim 5 wherein the moisture content of said second amorphous silica is less than about 10% by weight.

7. The method according to claim 1 wherein the moisture content of said first amorphous silica is from about 65 to 70% by weight.

8. A method for removing chill haze precursors from a fermented beverage, comprising contacting said beverage with about 60 to 280 ppm of a first amorphous silica and about 40 to 120 ppm of a second amorphous silica for a period of time sufficient to effect sorption by said silicas of said haze precursors, and thereafter separating said silicas from the beer, said first amorphous silica having a moisture content of at least about 30% by weight and having a surface area in the range of from about 300 to about 800 $m^2/g$, a pore volume of from about 0.9 to about 1.8 ml/g, an average pore diameter of from about 30 to about 1200 Å, and an average particle size of less than about 40 microns; said second amorphous silica having a moisture content of less than 30% by weight and having a surface area in the range of from about 200 to about 700 $m^2/g$; a pore volume of from about 1.0 to about 1.6 ml/g, an average pore diameter of from about 50 to about 300 Å, and an average particle size of less than about 20 microns; wherein the weight ratio of the amount of said second amorphous silica with which the beer is contacted to the amount of said first amorphous silica with which the beer is contacted is in the range of from about 1:7 to 1:1.

9. The method according to claim 8 wherein said beer is contacting a slurry of said first amorphous silica and said second amorphous silica in a medium selected from the group consisting of water and beer.

10. The method according to claim 9 wherein said slurry is added to a flowing stream of said beer.

11. The method according to claim 8 wherein said contacting comprises, at least in part, flowing said beer through a filter having a precoat layer containing said first amorphous silica and said second amorphous silica.

12. The method according to claim 8 wherein said first amorphous silica has the following properties:
Pore Volume: about 0.9 to 1.1 ml/g
Pore Size: about 1000 to 1200 Å
Surface Area: about 600 to 700 m$^2$/g
Particle Size (average): less than about 40 microns
and wherein said second amorphous silica has the following properties:
Pore Volume: about 1.0 to 1.4 ml/g
Pore Size: about 120 to 160 Å
Surface Area: about 250 to 350 m$^2$/g
Particle Size (average): less than about 10 microns.

13. The method according to claim 12 wherein the moisture content of said second amorphous silica is less than about 10% by weight.

14. The method according to claim 8 wherein the moisture content of said first amorphous silica is from about 65 to 70% by weight.

15. A method for removing proteins from a liquid medium in which proteins are dissolved, dispersed or suspended, comprising contacting said medium with both a first amorphous silica and a second amorphous silica for a period of time sufficient to effect sorption by said silicas of proteins, and thereafter separating said silicas from said medium, said first amorphous silica having a moisture content of at least about 30% by weight and having a surface area in the range of from about 300 to about 800 m$^2$/g, a pore volume of from about 0.9 to about 1.8 ml/g, an average pore diameter of from about 30 to about 1200 Å, and an average particle size of less than about 40 microns; said second amorphous silica having a moisture content of less than 30% by weight and having a surface area in the range of from about 200 to about 700 m$^2$/g, a pore volume of from about 1.0 to about 1.6 ml/g, an average pore diameter of from about 50 to about 300 Å, and an average particle size of less than about 20 microns; wherein the weight ratio of the amount of said second amorphous silica with which the beer is contacted to the amount of said first amorphous silica with which the beer is contacted is in the range of from about 1:7 to 1:1.

16. A composition for chillproofing beer by contacting beer therewith to effect sorption from the beer of haze precursors, comprising a first amorphous silica and a second amorphous silica, said first amorphous silica having a moisture content of at least about 30% by weight and having a surface area in the range of from about 300 to about 800 m$^2$/g, a pore volume of from about 0.9 to about 1.8 ml/g, an average pore diameter of from about 30 to about 1200 Å, and an average particle size of less than about 40 microns; said second amorphous silica having a moisture content of less than 30% by weight and having a surface area in the range of from about 200 to about 700 m$^2$/g, a pore volume of from about 1.0 to about 1.6 ml/g, an average pore diameter of from about 50 to about 300 Å, and an average particle size of less than about 20 microns; wherein the weight ratio of the amount of said second amorphous silica to the amount of said first amorphous silica is in the range of from about 1:7 to 1:1.

17. The composition according to claim 16 wherein said first amorphous silica has the following properties:
Pore Volume: about 0.9 to 1.1 ml/g
Pore Size: about 1000 to 1200 Å
Surface Area: about 600 to 700 m$^2$/g
Particle Size (average): less than about 40 microns
and wherein said second amorphous silica has the following properties:
Pore Volume: about 1.0 to 1.4 ml/g
Pore Size: about 120 to 160 Å
Surface Area: about 250 to 350 m$^2$/g
Particle Size (average): less than about 10 microns.

18. The composition according to claim 16 further comprising an additional member selected from the group consisting of natural silicates, synthetic silicates, polyamides, and mixtures thereof.

* * * * *